US008458225B2

(12) United States Patent
Salemann

(10) Patent No.: US 8,458,225 B2
(45) Date of Patent: Jun. 4, 2013

(54) SPATIALLY REFERENCED MULTI-SENSORY DATA DIGITALLY ENCODED IN A VOXEL DATABASE

(75) Inventor: Leo Salemann, Sammamish, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 641 days.

(21) Appl. No.: 12/707,117

(22) Filed: Feb. 17, 2010

(65) Prior Publication Data

US 2011/0202553 A1    Aug. 18, 2011

(51) Int. Cl.
*G06F 17/00* (2006.01)

(52) U.S. Cl.
USPC ............... 707/803; 707/769; 707/E17.008; 707/E17.056; 345/424; 703/1

(58) Field of Classification Search
None
See application file for complete search history.

(56) References Cited

U.S. PATENT DOCUMENTS

| | | | | |
|---|---|---|---|---|
| 7,050,054 | B2 * | 5/2006 | Halmshaw | 345/424 |
| 7,317,456 | B1 * | 1/2008 | Lee | 345/427 |
| 7,822,266 | B2 * | 10/2010 | Wellington et al. | 382/154 |
| 8,217,939 | B1 * | 7/2012 | Bonciu et al. | 345/424 |
| 2004/0174357 | A1 * | 9/2004 | Cheung et al. | 345/419 |
| 2008/0165186 | A1 * | 7/2008 | Lin | 345/419 |

OTHER PUBLICATIONS

Baer, Wolfgang, et al. "Modeling Terrain for geo-pairing and casualty assessment in OneTess", Modeling and Simulation for Military Operations III, vol. 6965, 69650K (2008).*

Lalonde, J., et al., "Natural terrain classification using three-dimensional ladar data for ground robot mobility," [online] Journal of Field Robotics, vol. 23, No. 10, Nov. 2006, pp. 839-861, retrieved from the Internet: <http://www.ri.cmu.edu/publication_view.html?pub_id=5611>.

Pollard, T., et al., "Change Detection in a 3-D World," [online] 2007 IEEE Conference on Computer Vision and Pattern Recognition, Jun. 17-22, 2007, retrieved from the Internet: <www.lems.brown.edu/~ntpollard/pollard_mundy_cvpr07.pdf>.

Mundy, J., et al., "Uncertain geometry: a new approach to modeling for recognition," [online] Proceedings of the SPIE, Automatic Target Recognition XIX, vol. 7335, pp. 73350Q-73350Q-12, May 4, 2009, retrieved from the Internet: <http://www.lems.brown.edu/~ozge/SPIE-Mundy-OzcanliFinal.pdf>.

Gebhardt, S., et al., "Polygons, point clouds, and voxels, a comparison of high-fidelity terrain representations," 2009 SIWZIE Awards, Simulation Interoperability Standards Organization, Nov. 20, 2009.

* cited by examiner

*Primary Examiner* — Fred I Ehichioya
*Assistant Examiner* — Michelle Owyang
(74) *Attorney, Agent, or Firm* — Terry M. Sanks, Esq.; Beusse Wolter Sanks Mora & Maire, P.A.

(57) ABSTRACT

A voxel database can store and manage a set of voxel records in a voxel table. Each of the records can have a unique voxel identifier. Each voxel record can include a set of different sensory attributes. The sensory attributes can include visual attributes, spectral signature attributes, olfaction attributes, audition attributes, gustation attributes, somatsensory attributes, and material composition attributes. Uniquely defined voxels of voxel database can be a volume unit on a grid (regular or non-regular) in three dimensional space, which is a voxel space. A correspondence can exist between voxels in the voxel space and volume units of a real world volumetric space from which geospatial data was directly gathered and encoded within the voxel database. Voxel space can be mapped to simulation space. Thus, simulators can consume data of the voxel space to generate three dimensional immersive environments having multisensory output.

33 Claims, 8 Drawing Sheets

SPATIALLY REFERENCED MULTI-SENSORY DATA DIGITALLY ENCODED IN A VOXEL DATABASE

BACKGROUND

The present disclosure relates to the field of simulation systems and geographic information systems and, more particularly, to spatially referenced multi-sensory data digitally encoded in a voxel database.

Complexity of simulated environments has grown exponentially in correspondence with the growth of simulation technologies. Simulated environments include computer based simulators, immersion simulators, and device assisted real-world simulations (Tactical Engagement Simulation (TES) systems, for example). Many of these simulators are designed to model real world scenarios, which require geospatial correspondence between a real world space and a simulation space. For instance, to successfully implement military personnel trainers, Intel analysis systems, mission rehearsal systems, and unmanned military systems, a simulation space must accurately reflect a geographic region being modeled.

Acquiring, and implementing geospatially correct information for simulated environments becomes increasingly difficult as output modes involved in a simulation increase. For example, many flight combat simulation environments not only provide a human with images seen out of a simulated cockpit view screen, but present data on simulated radar screens, thermal imaging screens, and other simulation equipped instrumentation. Output presented on each of these mechanisms change based upon user-controlled decisions. All of these output mechanisms provide divergent data, which must be synchronized with one another, often in real-time. Synchronization problems among the different output modalities of a simulation environment are highly distracting to a user, which significantly detracts from the user experience provided by a simulation. This problem escalates as additional output modalities (e.g., olfactory output, tactile output, thermal output, and audio output) are included in a simulation environment.

In traditional simulation implementations, terrain for a simulated environment is generated using vector based rendering and modeling tools. These vector based tools use a series of points in space to define polygons, which are manipulated via linear algebra transforms to ultimately create visual output. As polygons used in vector based rendering become smaller, an increasingly large number of points need to be defined and manipulated per unit of three dimensional (3D) space. Vector based graphical tools have traditionally not required point-to-point mappings with other output modalities. This is nevertheless a requirement for successfully implementing a simulation environment. That is, output values of all presented output types need to be highly synchronized to a common geographic reference space, else a simulation experience suffers. Geospatial accuracy (correspondence between a simulator reference space and a real-world reference space) typically decreases as simulation smoothness (synchronization between different output modalities of a simulation environment) increases.

Additionally, a substantial delay currently is incurred between receiving raw geospatially correct information, analyzing this data, converting this data into a simulation acceptable format, and producing a simulation environment based on this data. Appreciably, real world information is dynamic and constantly changing. In tactical situations, information currency can be critical. At the same time, training tactical response personnel before an engagement using an immersive trainer (e.g., a mission rehearsal simulator) can decrease mission mistakes, which directly save lives. Thus, there is currently an unresolved (and some have believed irresolvable) tension between creating a realistic immersive trainer and producing a simulation environment that incorporates current information.

BRIEF SUMMARY

The disclosure spatially references multi-sensory data that is digitally encoded in a voxel database. A voxel database is a volumetric database where each voxel is a unit of volume. Each voxel can be uniquely identified in the voxel database. Each unique voxel can then be related to different types of sensory (and semantic) information. Sensory information can include, for example, visual information (color, transparency, blur), acoustic data, olfactory data, tactile data, temperature data, humidity data, etc. Any type of data able to be recorded for a volumetric unit by a real-world sensor, can be stored and associated with a voxel. Additionally, mapping can exist between voxels and volume units of a real world volumetric space. This correspondence can be highly beneficial, as relatively "raw" data acquired from real-world sensors can be accurately mapped to voxels by automated computer tools. Thus, the voxel database can be inherently geospatially accurate, can be continuously updated using information feeds, and can be used to store an arbitrarily large quantity of diverse data elements in a geospatially searchable fashion.

In one embodiment, simulators can be designed that directly consume the data of the voxel database. For example, visual output can be produced by voxel-based rendering engines (as opposed to vector based ones). Olfactory output, tactile output, and the like can be similarly handled by voxel based user interface engines. In another embodiment, automated tools can convert voxel database content into a different format, which is utilized by simulation engines. For example, an automated tool can convert a voxel encoded visual attributes (raster based) into a vector based format, which can be utilized by a simulation engine.

One aspect of the disclosure is for handling spatially referenced multisensory data. Within a voxel database, a set of records can be established in a voxel table. Each of the records can have a unique voxel identifier. For each record, values can be stored for a set of different sensory attributes. The sensory attributes can include visual attributes, spectral signature attributes, olfaction attributes, audition attributes, gustation attributes, somatsensory attributes, and/or material composition attributes. A request can be received for voxel database information for a request defined volume of voxel space. The voxel database can be queried to generate a response set of voxels and sensory attributes associated with the voxels. The set of voxels can consist of the voxels of the defined volume of voxel space. The response set can be provided to a simulator. The simulator can have a user interface for a simulated three dimensional volume of space that corresponds to the defined volume of voxel space. The simulator can include at least one sensory output device, which generates output based upon values of the sensory attributes corresponding to voxels of the response set.

Another aspect of the disclosure is for a simulation device. The simulation device can include processing components, input devices, output devices, and computer program products, which include a voxel engine and a simulation application. The voxel engine can directly consume voxel-encoded volumetric data of a voxel space. Each of the voxels can be a volume unit on a regular grid in three dimensional space, which is the voxel space. A correspondence can exist between voxels in the voxel space and volume units of a real world volumetric space from which geospatial data was directly gathered and encoded as the voxel-encoded volumetric data. A correspondence can also exist between voxels in the voxel space and simulation units in a simulation space. The simulation application can generate a user interactive interface for the simulation space. The simulation application can receive using input via the set of input devices and can respond to the user input by altering expressed characteristics of the simulation space. The output for the simulation space is produced by the output devices. The simulation application can permit a user to selectively navigate within the simulation space, which results in changes to which simulation units are expressed to the user via the output devices. Output for at least two senses can be generated by the output devices for each simulation unit in accordance with code of the simulation application. Values used for output can be from voxel corresponding values of the voxel-encoded volumetric data.

Still another aspect of the disclosure can be for a voxel database for storing spatially related multi-sensory data within an indexed tangible storage medium. The voxel database can store and manage a set of voxel records in a voxel table. Each of the records can have a unique voxel identifier. Each voxel record can include a set of different sensory attributes. The sensory attributes can include visual attributes, spectral signature attributes, olfaction attributes, audition attributes, gustation attributes, somatosensory attributes, and material composition attributes. Uniquely defined voxels of a voxel database can be a volume unit on a grid (regular or non-regular) in three dimensional space, which is a voxel space. A correspondence can exists between voxels in the voxel space and volume units of a real world volumetric space from which geospatial data was directly gathered and encoded within the voxel database.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other tangible storage medium. The program may also be digitally conveyed from location-to-location as a digitally encoded signal conveyed via a carrier wave. The described program can be a single program or can be implemented as multiple subprograms, each of which interact within a single computing device or interact in a distributed fashion across a network space.

DETAILED DESCRIPTION

Figure 1:
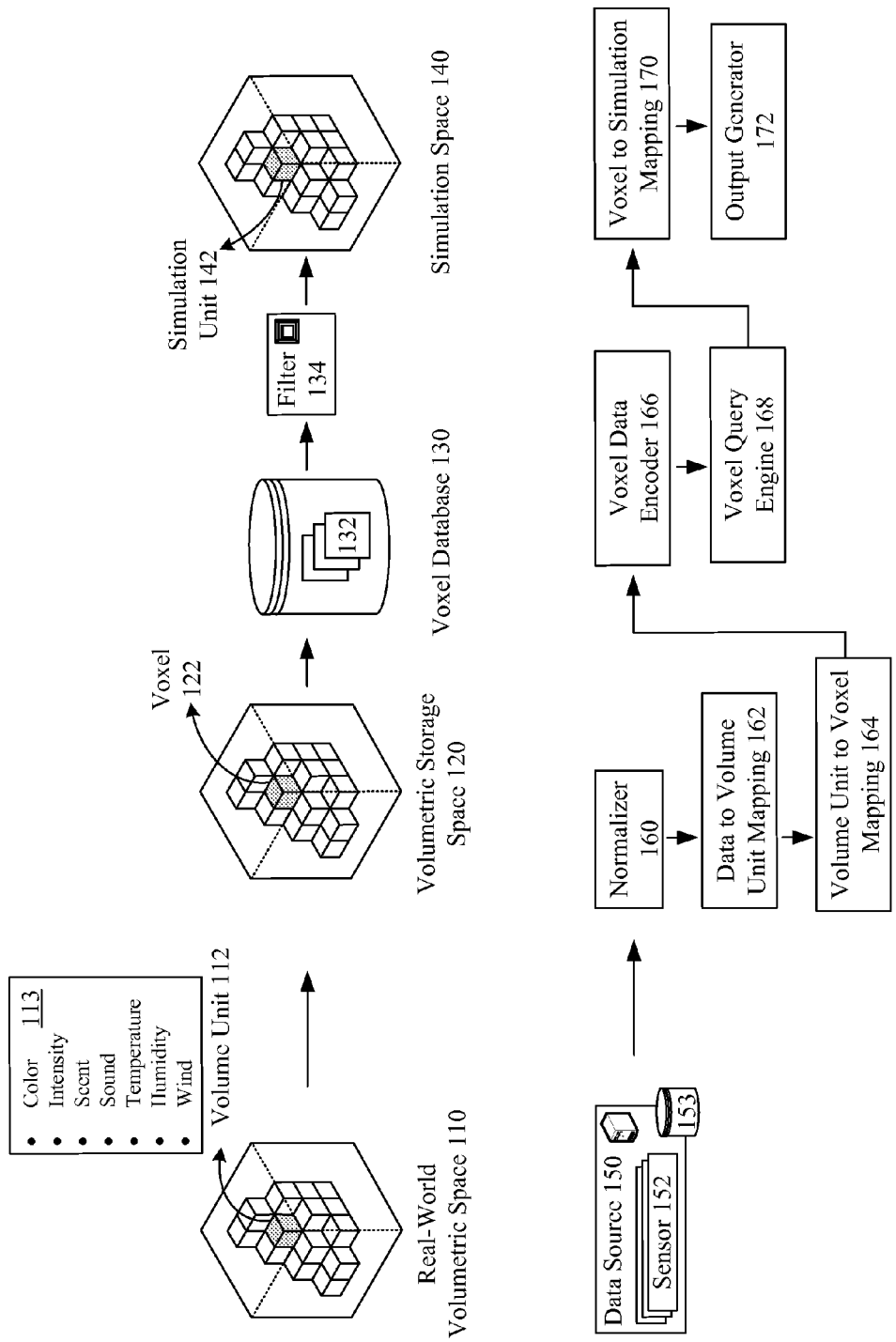
FIG. 1 is a schematic diagram showing a voxel database for spatially referenced multi-sensory data in accordance with an embodiment of disclosure.

The disclosure provides a volumetric storage space 120 in which multisensory data is encoded. The multisensory data can be acquired from a real-world volumetric space 110 and can be used when expressing a simulation space 140. The real-world volumetric space 110, the volumetric storage space 120, and the simulation space 140 can correspond to each other.

More specifically, the volumetric storage space 120 can be a space composed of a set of volumetric units, called voxels 122. Data elements can be directly referenced to voxels 122, which permits these data elements to be spatially placed in the volumetric storage space 120. The data elements need not have any specific identity outside their relationship to the voxels 122, which permits raw data to be inserted into the volumetric storage space 120. For example, satellite imagery, LIDAR points, and other information can all be inserted into the volumetric storage space 120 and referenced to voxels 122. The other information can include sounds, odors, textures, humidity levels, and other sensory information. Viewed in one manner, each voxel 122 can be thought of as a three dimensional puzzle piece that fits together with other puzzle pieces to form the volumetric storage space 120. Information included in the volumetric storage space 120 can be extracted post-storage. For example, outlines of objects can be detected within the volumetric storage space 120 to determine a presence or absence of a building, vehicle, crowd, or other object within the volumetric storage space 120.

It should be noted that data elements can be continuously inserted into the volumetric storage space. In this manner, data elements can be combined to continuously increase a "resolution" of the data image contained within the volumetric storage space 120. In one embodiment, the volumetric storage space 120 can be a probabilistic one. In other words, data elements can be stored in the volumetric storage space 120 that have a probability of being contained therein but have a probability of not actually being contained therein. For example, if an incomplete "data image" of a building (which can be formed by 1 . . . N quantity of voxels) exists in the volumetric storage space 120, an associated probability of the building being present in the volumetric storage space 120 can be at a value of forty percent where a sixty percent probability value exists that the building is not present in the volumetric storage space 120. Thus, the volumetric storage space 120 is able to handle uncertainty of data elements in a manner that traditional storage spaces cannot.

The volumetric storage space 120 can store data elements of any nature. For example, the data elements of the volumetric storage space 120 can include visual information in two or three dimensions. Data elements can also include material composition elements, elevation data, and the like. Any type of information that can be spatially related to a volumetric unit (e.g., voxel) can be stored in the volumetric storage space 120.

Another way of expressing the volumetric storage space 120 is by using database terminology. Stated differently, each voxel 122 can have a unique identifier, which in a database system (e.g., database 130) can be a primary key of a database table having voxel records. Data elements of the volumetric storage space 120 can be attributes of the voxel records. Relative reference points of data elements within a corresponding voxel can be optionally recorded, should a spatial positioning of a data element be needed at a level of granularity less than a single voxel 122. The only linkage of each data element within the database 130 can be defined by its relationship to a voxel 122. That is, instead of referencing visual, material, or other characteristics of a building to that building, as would be the case with a standard database— visual, material, or other characteristics can be referenced directly to voxels 122.

This ability to relate any number of characteristics (e.g., data elements) having a spatial component to the volumetric storage space 120 at a suitable spatial location (via voxel referencing) is significant and unique to a voxel database 130. It is this ability that permits "raw" data to be directly inserted into the volumetric storage space 120. The raw data (e.g., satellite data, for example) when acquired is typically formatted in a spatial manner well suited for proper insertion into the volumetric storage space 120. Otherwise, input acquired from satellites (or similar sources) must be processed and categorized to specific objects (e.g., buildings, roads, etc). These objects are typically stored in databases as discrete entities having object specific attributes. Each time processing occurs, a data loss can result, as assumptions, which must be made during processing, may not be true. For example, during processing, material composition attributes are historically stored against to objects (e.g., buildings, roads, etc.) formed from these materials. There may be, however, uncertainty in which of a set of possible objects are actually present in a given spatial region. Thus, during processing, material composition attributes can be stored against the wrong objects. Conventional practices (that do not utilize a volumetric storage space 120) may attempt to correct for processing errors, as described above. Error correction techniques, however, do not change the fact that there is a fundamental disconnect with the paradigm used for storing data given the manner in which this data is acquired. Use of a volumetric storage space 120 is believed to resolve this disconnect, and believed to achieve numerous advantages as described herein.

FIG. 1 is a schematic diagram 100 showing a voxel database 130 for spatially referenced multi-sensory data in accordance with an embodiment of the inventive arrangements disclosed herein. The voxel database 130 can represent a volumetric storage space 120 of unique volumetric storage units called voxels 122. Different data elements of the voxel database 130 can be stored to specific ones of the voxels 122. A spatial position of the data elements within the volumetric storage space 120 can be defined at least in part by which of the voxels 122 the data elements are stored. These data elements can include a number of different sensory attributes, such as visual attributes, olfaction attributes, audition attributes, gustation attributes, somatsensory attributes, material composition attributes, and the like. A visual attribute is one relating to the human sense of sight. An olfaction attribute is one relating to a human sense of smell. An audition attribute is one related to a human sense of hearing. A gustation attribute is one relating to a human sense of taste. A somatsensory attribute is one related to a human sense of touch (including heat sensing). A material composition attribute is an attribute pertaining to how a material is formed, such as the substances used to form a given material.

Thus, a "smell" or other sensory attribute can be stored for a given voxel 122 which represents an odor present within that volumetric space. Data from units 113 of real-world space 110 can be used to populate sensory attributes of the voxel database 130. Further, sensory attributes from the voxel database 130 that are indexed against voxels 122 can be used to generate sensory attributes within a simulation space 140.

More specifically, the voxel database 130 can be a database of a geographic information system (GIS) that captures, stores, analyzes, manages, and/or presents data that is linked to a location. In the database 130, records 132 can be mapped or related to voxels 122, each of which has a unique identifier. Each voxel 122 can be a volume element representing a value on a grid in three dimensional space, specifically volumetric storage space 120.

In one embodiment, volume units 112 from a real-world volumetric space can be directly mapped to voxels 122 of volumetric storage space 120. Any consistent scale can exist between a volume unit 112 and a voxel 122. For example, for a given geographic region, one or more data sources 150 can utilize a set of sensors 152 to capture and record data 113 for a specific volume unit 112. The data 113 can include color, intensity, scent, sound, temperature, humidity, wind, texture, composition, and other definable attributes of volume unit 112 and/or objects within volume unit 112. The data 113 can be stored in a data store 153 or other medium, which includes paper documents.

Before converting data 113 into voxel 122 mapped records 132, the data 113 can be optionally normalized (by normalize 160) to a definable standard. A data to volume mapping unit 162 can determine which unit 112 data 113 elements correspond to. Then, volume unit to voxel mapping component 164 can determine which voxel 122 corresponds to which volume unit 112. The voxel database 130 can be associated with a voxel query engine 168, which permits records 132 to be retrieved based on requestor supplied criteria. Voxel data encoder 166 can digitally encode the data 113 into a voxel database format.

In one embodiment, a set of optional filters 134 can be established between the voxel database 130 and a related simulation space 140. Filters 134 can include voxel to simulation mapping 170 modules. An output generator 172 can cause output devices (e.g., video displays, olfactory generators, speakers, tactile devices, and the like) to form simulation space 140.

Figure 2A:
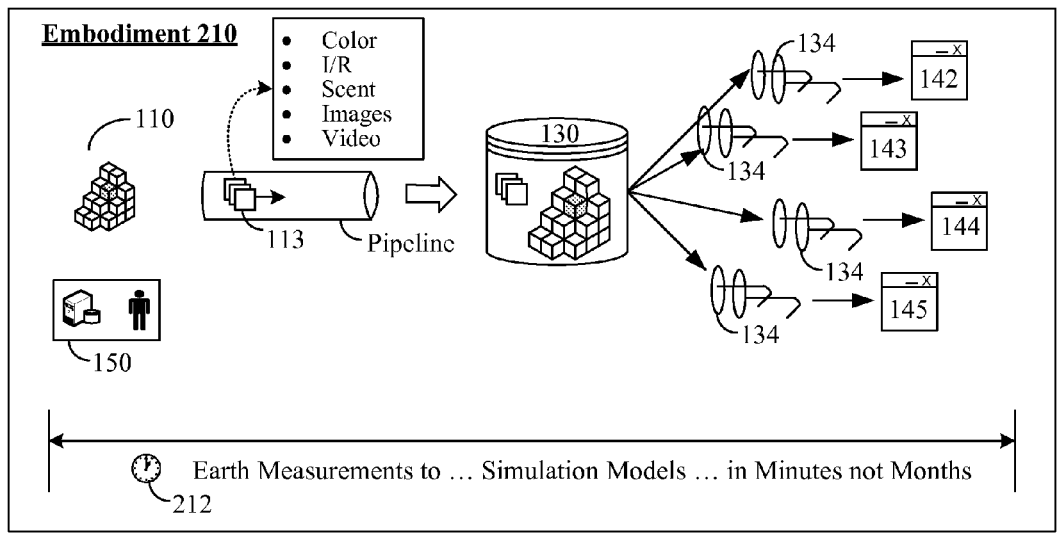
FIG. 2A describes an embodiment for populating and using a voxel database and a simulator able to consume data of the voxel database.
Figure 2A:
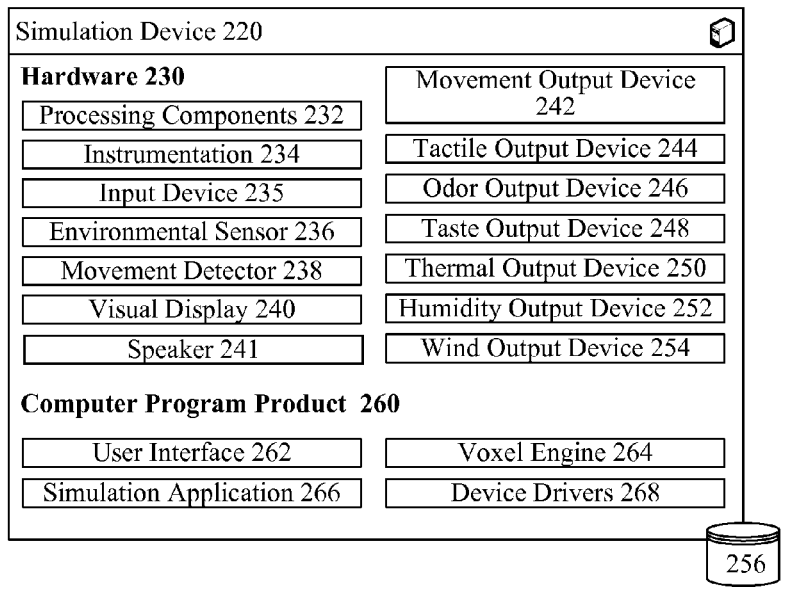
Figure 2B:
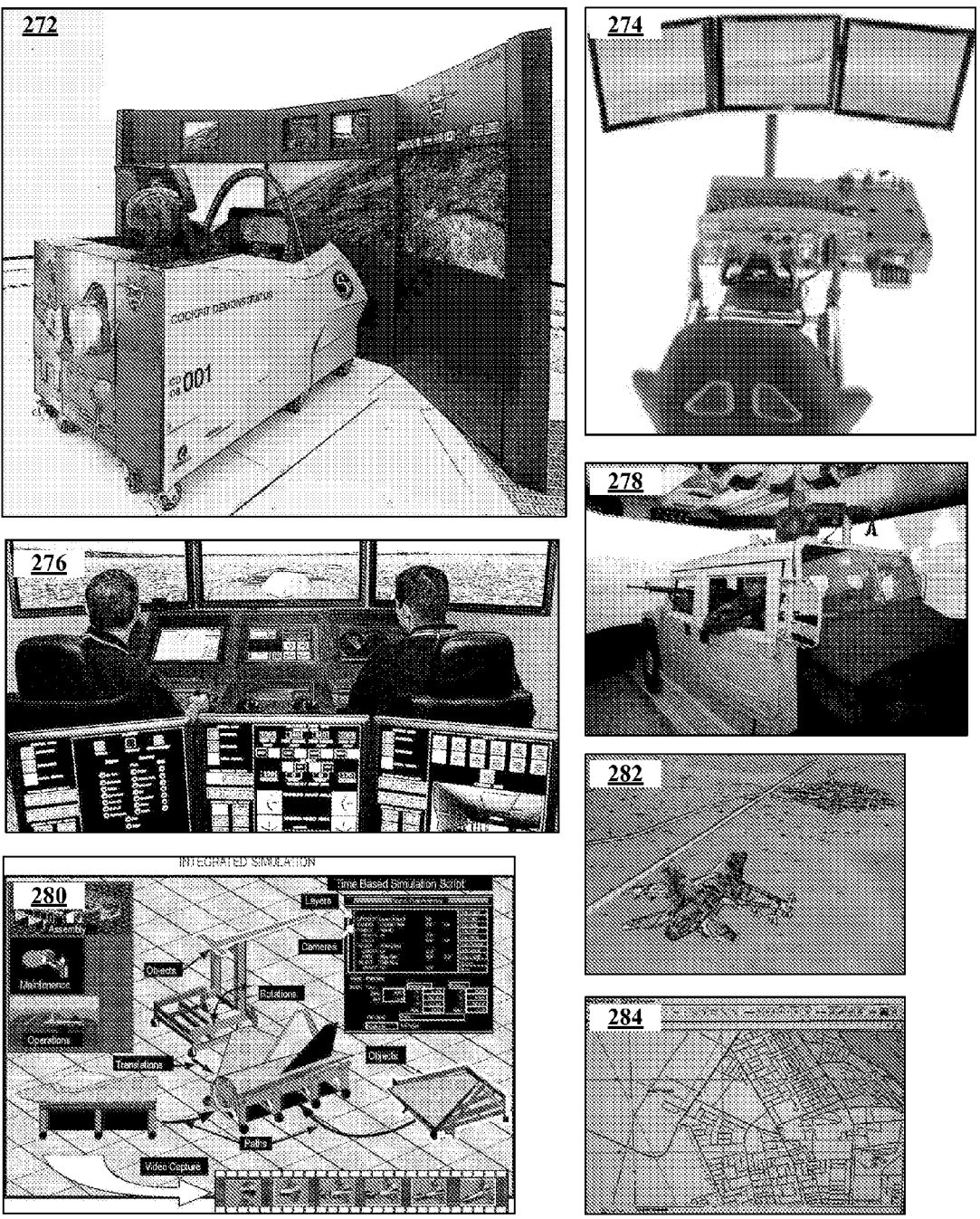
FIG. 2B shows embodiments for simulators and simulator interfaces in accordance with an embodiment of disclosure.

Embodiment 210 of FIG. 2A provides another description for populating and using voxel database 130. Using embodiment 210 as a description reference, data 113 captured from a real-world volumetric space 110 can be conveyed over a single pipeline to a Voxel database 130. The data 113 can come from many sources 150, such as satellite imagery, digital elevation model (DEM) data, video, SIGINT, HUMINT, and the like. Additionally, the filtered (134) voxel database 130 can provide data for multiple different types of simulators (simulation space 140). For example, assuming the simulators all include terrain models for a real-world volumetric space 110, visual terrain simulators 142, constructive simulators 143, thermal simulators 144, radar simulators 145, and the like can all be generated from voxel database 130 stored records 132.

The common database 130 product can be a probabilistic one in which uncertainty is handled. In one embodiment, query engine 168 can include multiple different components for producing different queries (e.g., mission rehearsal query, training query, analysis query, etc.), which handle uncertainty in different manners for different types of consumers. It should be appreciated that embodiment 210 can be largely automated, which permits the process 212 from taking measurements, to producing simulation models to occur within minutes and not months, as is the case with conventional information gathering and modeling processes.

FIG. 2A also shows a schematic diagram of a simulation device 220 for presenting simulation space 140 data. Simulation devices 220 can vary greatly in terms of hardware 230 and computer program products 260 used, which causes user interfaces 262 (e.g., interfaces 142-145) to vary accordingly. As noted from embodiment 210, simulators (device 220) consuming geospatial data from voxel database 130 can include many different diverse types of systems, such as mission rehearsal systems, unmanned systems, intelligence analysis systems, and training systems. Simulation devices 220 can also include personal computers, handheld devices, and other such computing devices. Simulation applications 266 can include applications that produce to interactive environments, which include computer games, trainers, and the like.

Simulation devices 220 can also include various input (items 234-238) and output (items 240-254) components, devices, or peripherals. In various embodiments, input/output components can be specific to a particular type of simulation device 220. Simulation devices 220 can include immersion devices and computer based simulators. Simulation devices 220 can further input for human-to-machine interactions (e.g., trainers) as well as for machine-to-machine interactions (unmanned vehicles, drones, robots, etc. —where the simulation is of "real" data for testing/teaching/utilizing the machine).

The hardware 230 can include a number of components 232-254. Processing components 232 of the hardware 230 can include one or more microprocessors, memory 256, a bus, network cards, and the like. Instrumentation 234 can include radar displays, altimeters, speedometers, and other buttons and gauges. Input devices 235 can include a keyboard, mouse, touch screen, joystick, and the like. Environmental sensors 236 can include cameras, pressure sensors, temperature sensors, laser sensors, and the like. The environmental sensors 236 can be human worn, vehicle attached, or sensors for detecting dynamic occurrences of a sensor laden environment. Movement detectors 238 can include accelerometer, gyroscopic, beam breaking, and other such sensors.

The visual display 240 can comprise a quantity (set of 0 to N) of linked display devices. In one embodiment, the display 240 can include a volumetric display device, which includes autostereoscopic displays, such as spatially-multiplexed parallax displays, lenticular-sheet displays, head-mounted displays, holograms, electro-holographic displays, parallax panoramagrams, and the like.

Movement output devices 242 can produce user-experienced motion. For example, rotational systems that generate centripetal force to simulate G-forces can be included in movement output devices. Movement devices 242 can affect an environment proximate to a user (e.g., floor, door, etc. moving in a simulation environment). Devices 342 can also be directly coupled to a user and/or device (e.g., simulated cockpit or seat) to which the user is attached.

Tactile output devices 244 can include peripherals that exist to permit blind people to read Braille, to vibrate (e.g., vibrating game consoles), to resist motion (e.g., force response joysticks), and to generate other touch sensitive responses. Different materials, such as inflatable materials, can automatically adjust their firmness/hardness by inflating. Further, adding various liquids to a material can cause that material to have a slicker or rougher feel.

Odor output devices 246 can generate output that stimulates a human's olfactory sense. For example, an odor output device 246 can be a computer peripheral that includes a scent cartridge that contains a set of primary odors. Combinations of these primary odors can be mapped to items to generate characteristic smells. For instance, the ISMELL device by DigiScents, Inc. utilizes a USB based peripheral having an odor cartridge that contains primary odors.

Taste output devices 246 can generate a particular taste. The taste can be extracted within a generated mist or within an edible strip ejected from a peripheral. Different artificial flavors and texture components can be stored within refillable cartridges of the taste output device. In one embodiment, different devices/components can be combined (e.g., devices 246 and 248) into a single output device that generates odorous combinations on strips of paper, which can be licked for taste. One example of such a combined device is the Sensory Enhanced Net eXperience (SENX) device by Trisenx, Inc.

Thermal output device 250 can generate heat and/or cold to a desired level. Heater and air conditioning technologies can be used for thermal output devices 250. The humidity output device 252 can change an amount of water vapor in the air to a desired level. Humidity output devices 252 can include misting devices, humidifiers, dehumidifiers, and the like. Wind output devices 254 can change user experienced air pressure. Fans and air flow inhibiting devices can be used as wind output devices 254. Components 234-254 are described for illustrative purposes only and are not to be construed as limiting contemplated embodiments. For example, an effect of many of the input/output devices 235-254) can be produced by reading/stimulating brain waves of a user. Thus, a brain wave scanner and/or simulator is one contemplated component 234-254 that is not explicitly shown in FIG. 2A.

The computer program products 260 of the simulation device 220 can include user interface 262, voxel engine 264, simulation application 266, and device drivers 268. The device drivers 268 can facilitate communications between an operating system (not shown, but is one contemplated computer program product 260) and a specific hardware (such as devices 234-254).

Voxel engine 264 can be an engine able to consume data of the voxel database 130. In one embodiment, the engine 264 can process a set of voxels 122 or a portion of volumetric storage space 120 consisting of any number of voxels. The voxel engine 264 can handle uncertainty and can inherently be probabilistic in nature. In one embodiment, raw (possibly filtered via filter 134) voxel data can be used to render video and to produce other model (non-visual) output using devices 240-254.

Simulation application 266 can include any executable program that utilizes geospatial data of the voxel database 130. The user interface 262 can be a part of the application 266 code and/or can be a front-end for the application 266 code.

In various embodiments, application 266 can include a surface ship training system (e.g., diagram 276), a combat leadership environment (CLE) system, a cockpit demonstrator (e.g., diagram 272 of the cockpit demonstrator of F-35 Lighting II Joint Strike Fighter), a flight simulator (e.g., diagram 274 of a flight simulator by Hotseat Chassis and diagram 282 of F-16 Aggressor) an incident management system (e.g., diagram 284), a deployable training environment, a modular open architecture simulation services infrastructure compliant application, a reconfigurable vehicle simulator (CCTT-RUS), a synthetic environment (SE) core compliant application, a one semi-automated forces (One SAF) system, a high-mobility multipurpose wheeled vehicle (HMMWV) (e.g., diagram 278), a heavy expanded mobility tactical truck (HEMTT), a Bradley fire support vehicle (BFIST) virtual simulator, a tactical engagement simulation (TES), a tactical vehicle system (e.g., diagram 280 of a tactical aircraft system), and the like. The simulator embodiments 270 are for illustrative purposes only and are not to be construed as limiting the disclosure.

Figure 3A:
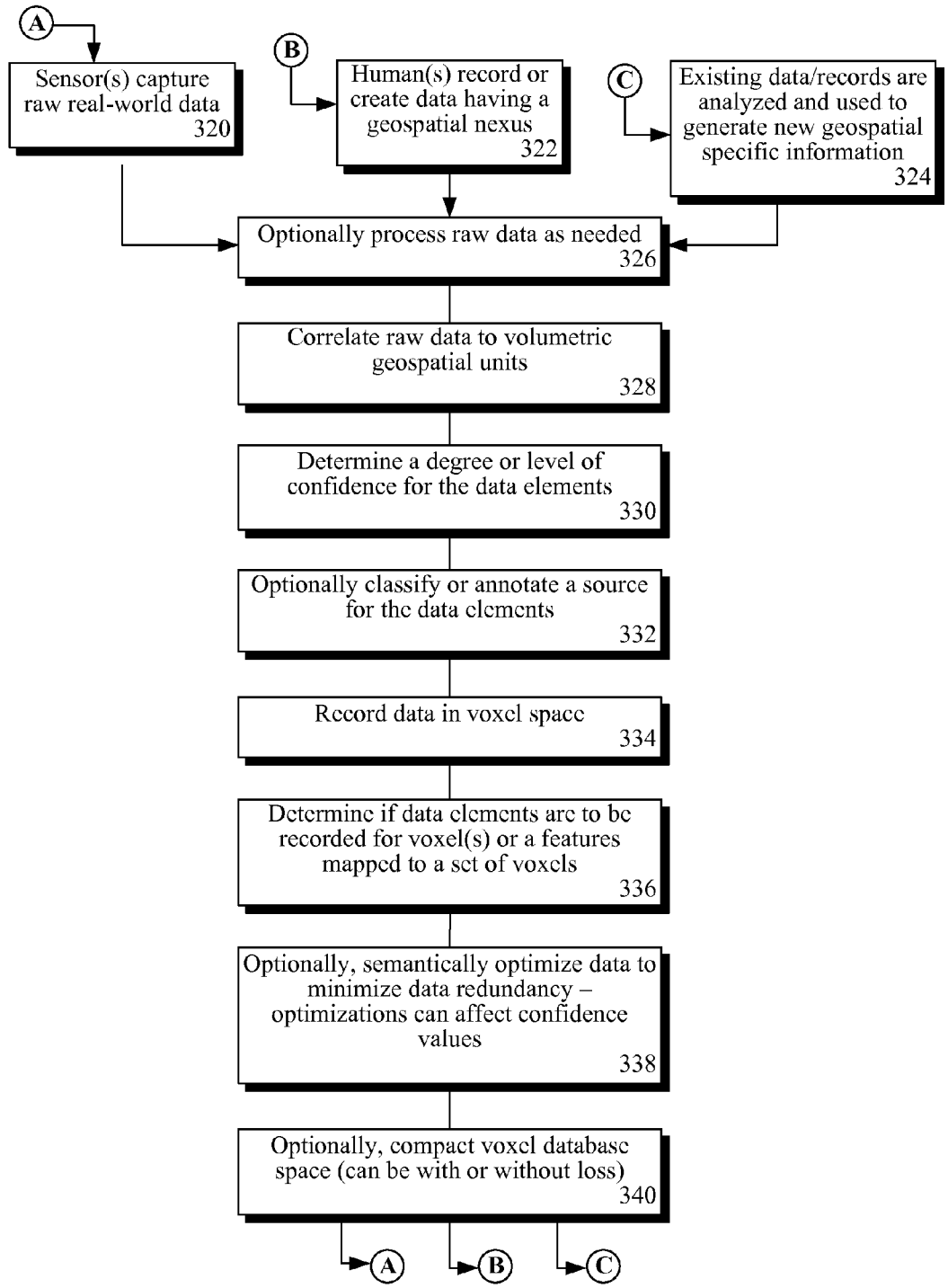
FIG. 3A is a flow chart of a process to acquire voxel database information from a data source 150 in accordance with an embodiment of disclosure.

FIG. 3A shows a process 310 to acquire voxel database 130 information from a data source 150 in accordance with an embodiment of disclosure. In process 310 data can be continuously received from a variety of sources, which include completely automated data capture sources (step 320), human data sources (step 322), and generating new intelligence data (or other information) by analyzing and combining existing source data (step 324). This data can be continuously being handled by the process, as represented by process 310 proceeding from step 340 to steps 320, 322, and/or 324. In process 310, data acquisitions and processes can occur in real-time or after an appreciable delay (e.g., handled in batch) depending upon implementation choices. Further, process 310 actions can occur asynchronously/synchronously as well as cyclically/randomly/based on conditional events depending on contemplated implementation choices.

Regardless of how raw data is gathered (step 320, 322, or 324), the data can be optionally processed as needed, as shown by step 326. In step 328, the raw data can be correlated to volumetric geospatial units. For example, data can be mapped to absolute or relative points in geographic space. In step 330, a degree or level of confidence for the mapped data elements can be determined. In optional step 332, data elements can be classified in accordance to a source type and/or a specific data source can be tagged or otherwise related to the data elements.

The data elements can be recorded in voxel space meaning the data elements can be encoded into a voxel database, as shown by step 334. The voxel database can optionally establish features composed of one or more shape primitives. These features can be related, such as through relational database (RDBMS) indexes and database primary/secondary keys, to voxels. An RDBMS is one contemplated indexing tool and other indexing mechanisms can be used with the disclosure. When data elements are recorded in voxel space, a determination can be made as to whether each data element is to be referenced against a set of one or more voxels, against a defined feature, or both, as indicated by step 336.

In optional step 338, data can be semantically optimized to minimize data redundancy. For example, approximately equivalent data from multiple sources can be combined into a common data element. This semantic combination can affect confidence values associated with a data element. For example, when multiple sources report a single data element consistently, a confidence value in that data element will increase. In optional step 340, a voxel database space can be compacted to minimize storage requirements. Different voxel (e.g., raster based) compaction algorithms can be utilized, which include loss-less compaction algorithms and lossy compaction algorithms.

Figure 3B:
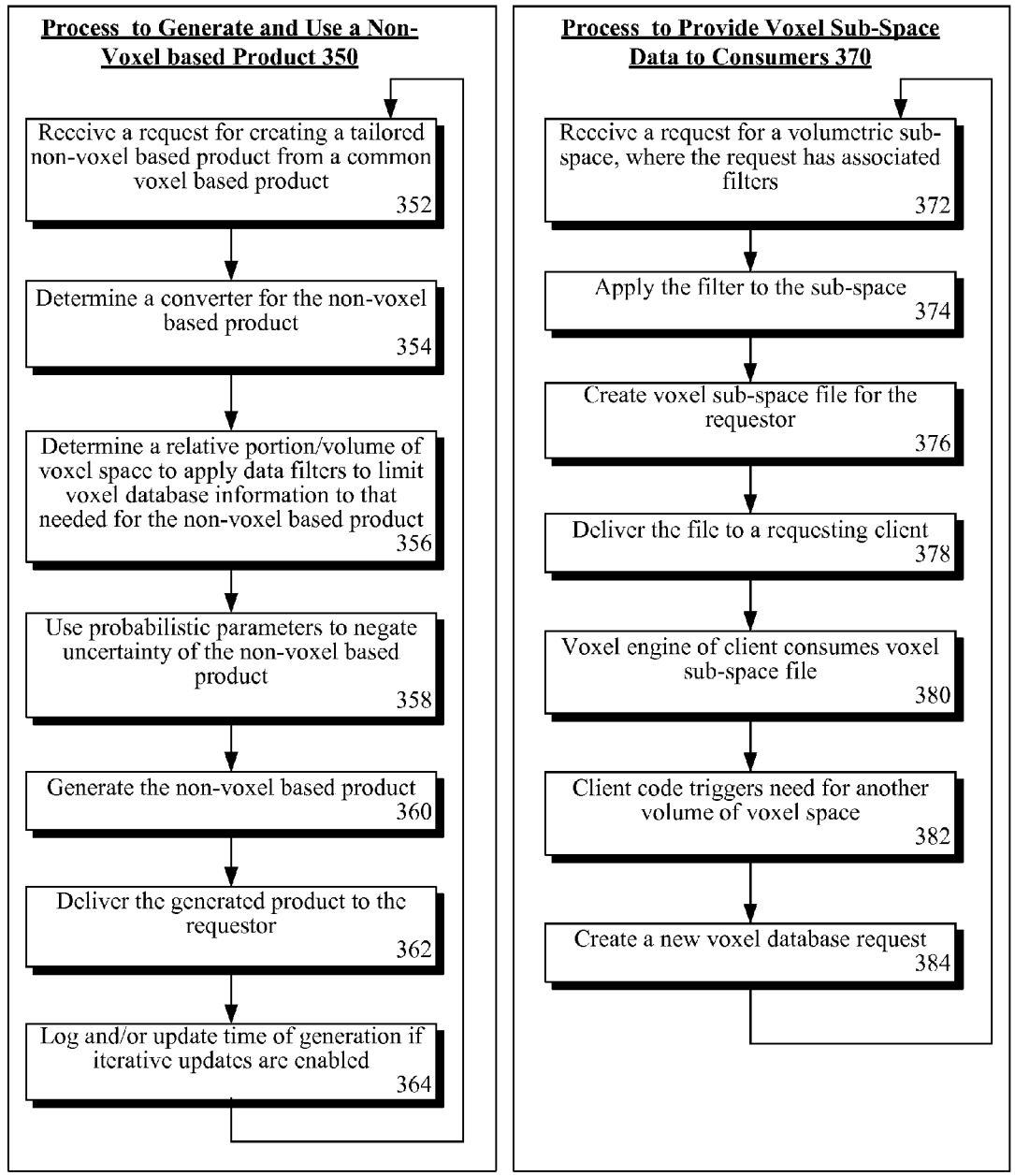
FIG. 3B is a set of flow charts for utilizing data of a voxel database in accordance with an embodiment of disclosure.

The voxel database populated though a process, such as process 310, can thereafter be treated as a common repository or centralized source for geospatially related information. This centralized source can be utilized by different consumers in different ways. In one scenario (process 350 shown in FIG. 3B), the voxel database can be used to generate a non-voxel based product. In another scenario (process 370 shown in FIG. 3B), the voxel database can provide voxel-subspace data sets to requestors, which these requestors can consume directly utilizing an internal voxel engine (e.g., engine 264).

Process 350 can begin in step 352, where a request is received by a voxel database server. The request can be for creating a tailored non-voxel based product from a common voxel based product. For example, a non-voxel based product can include a vector based graphic product containing geospatial information needed to generate terrain of a simulator's graphic engine (vector based). Additional information (e.g., semantic information needed for the simulator, other sensory data) can be needed for the non-voxel based product, which must be placed in a suitable format—which can vary from one non-voxel based product to another. For example, voxel database attributes for odor or taste can be converted into a format consumable by an ISMEL, SENX, or other odor (e.g., device 246) or taste (e.g., device 248) output device. Conversion specifics can be specified within a converter. In one embodiment, converters can be implemented in a modular or pluggable fashion, which makes the disclosure easier to extend to adapt for new or different technologies. An appropriate converter for the request can be determined in step 354.

In step 356, a relative portion or volume of voxel space needs to be determined. That is, the request will rarely be for an entire volume region stored by the voxel database, but will likely be for a volumetric subspace specifically needed by the non-voxel based product. Additionally, data within the requested volumetric subspace can be filtered by applied data filters, so that only the information needed for a specific product of the request is considered. In step 358, probabilistic parameters can be utilized to negate uncertainty inherent in the voxel database when generating the non-voxel based product. Different thresholds and/or parameters can be utilized to determine what level of uncertainty is to be retained within the non-voxel based product, which is generated in step 360. The generated product can be delivered to the requestor in step 362.

Some generated products can require periodic updates form the voxel database in order to retain information currency. In one embodiment, optimizations can be implemented so that only relatively new information needs to be considered for some update operations. When iterative updates are a concern, information can be logged and/or time attributes of the voxel database can be updated as appropriate, which is shown by step 364. The process 350 can repeat as needed, which is expressed by proceeding from step 364 to step 352.

Process 370 can begin in step 372, where a request for a volumetric sub-space is received. The request can have a set of associated filters. Unlike process 350, it is contemplated that a requestor of process 370 can directly consume voxel encoded information. In step 374, the filter can be applied to the voxel sub-space to conditionally exclude data of the voxel database. This is important as the voxel database can be a centralized repository that stores a myriad of data attributes in a voxel related manner, where only a subset of the data attributes are of concern for a specific requestor. In one optional embodiment, probabilistic parameters can be applied to negate uncertainty when generating the voxel sub-space. This optional step (not shown) can be taken when satisfying a request (step 372) for a non-probabilistic voxel subspace.

In step 376, a file (or set of files) containing the requested information can be created. In step 378, the created file(s) can be delivered to a requesting client, such as by delivering the file(s) over a network. A voxel engine of the client can consume or utilize the voxel sub-space file, as shown by step 380. In one embodiment, the voxel database can be directly accessible and used by the clients, in which case a creation and utilization of a locally create file (of a voxel subspace) can be unnecessary.

In one embodiment, the voxel sub-space files can be encoded in a local media storage area (e.g., hard drive) for use by a client as needed. This prevents a need for continuous and/or stable network connectively between the client and the voxel database. In one embodiment, suitable voxel sub-space laden files can be encoded in a portable medium (e.g., optical, magnetic, or other) and disseminated/located to clients periodically.

In another embodiment, data sets can be continuously requested by a client as a simulator needs a data for a different volumetric space. That is, executing client code can trigger a need for another volume of voxel space, as shown by step 382. When no local cache exists for this needed information, a new voxel database request (submitted over a network) can be created, as shown by step 384, which results in the request being handled in step 372.

Figure 4:
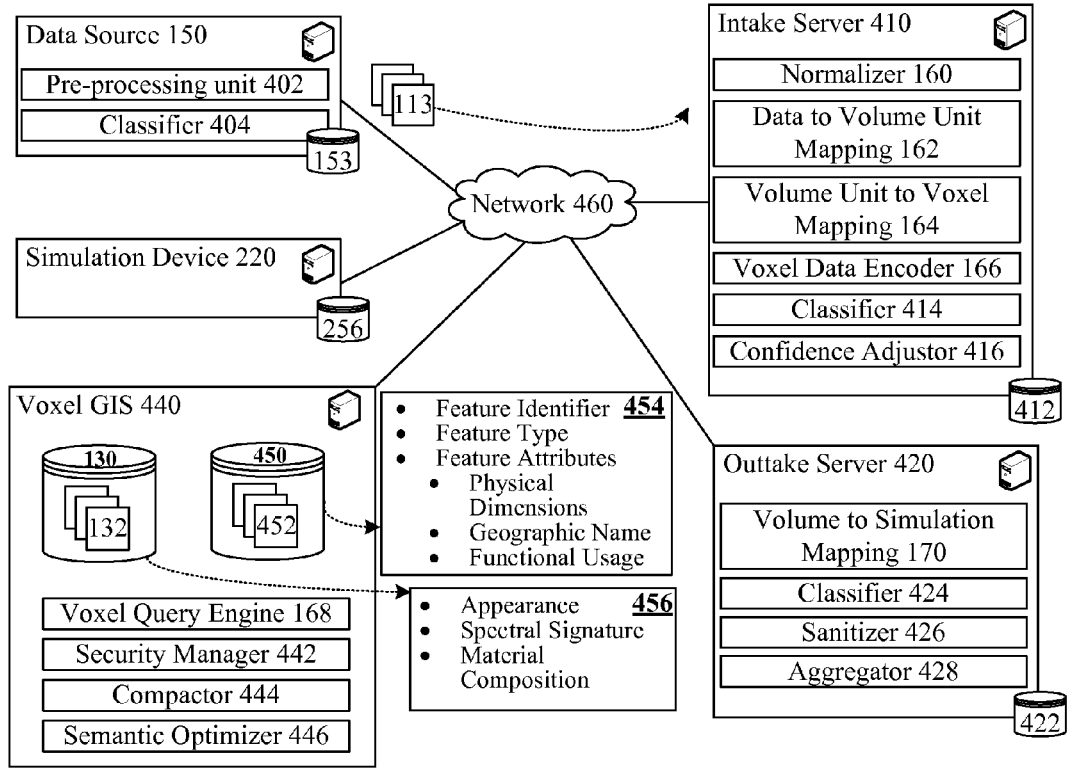
FIG. 4 is a schematic diagram of a system including a voxel database for spatially referenced multi-sensory data in accordance with an embodiment of disclosure.
Figure 4:
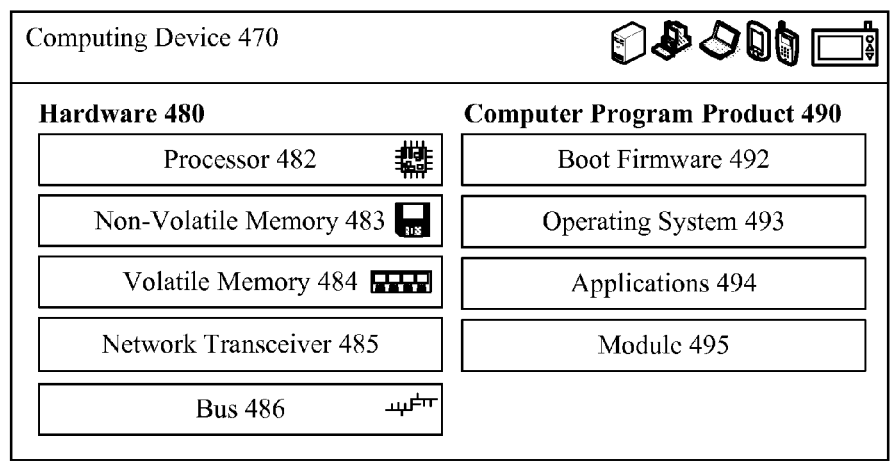
Figure 5:
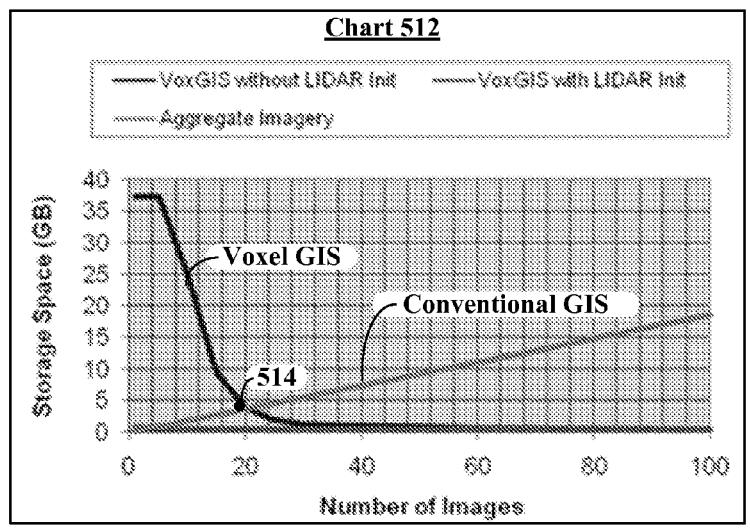
FIG. 5 demonstrates aggregation efficiency of a voxel database and a relationship between voxels, shapes, and features in accordance with an embodiment of disclosure.
Figure 5:
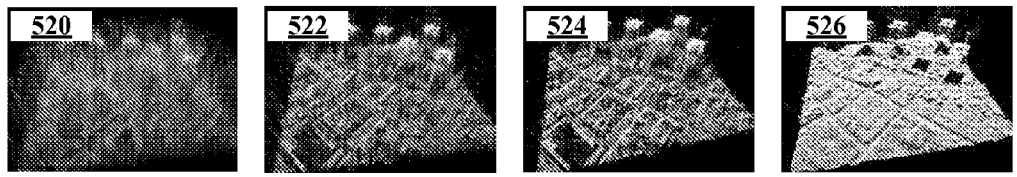
Figure 5:
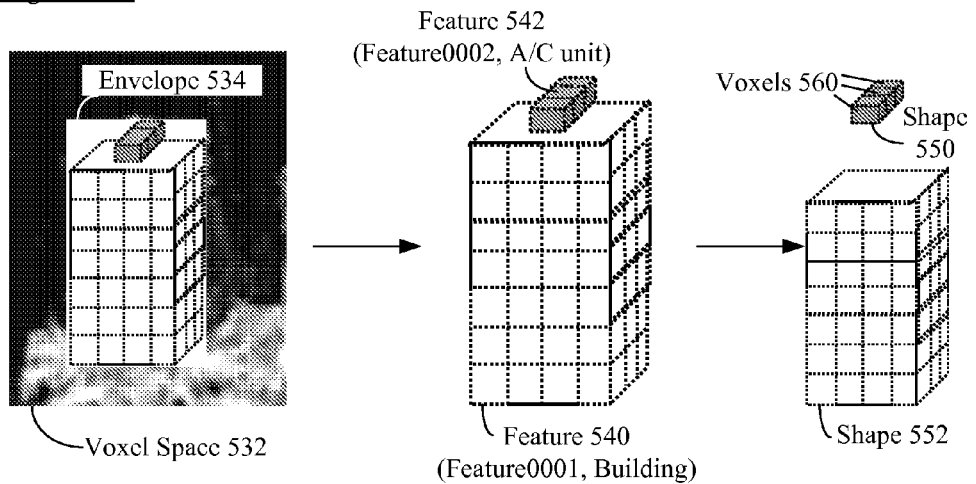

FIG. 4 is a schematic diagram of a system 400 including a voxel database 130 for spatially referenced multi-sensory data in accordance with an embodiment of the inventive arrangements disclosed herein. In system 400, a set of data sources 150, a set of simulation devices 220, an intake server 410, an outtake server 420, a Voxel geographic information system 440, and other such components can be communicatively linked via a network 460. In lieu of connectivity via network 460, components of system 400 can exchange information via portable media data exchanges, paper document correspondences, human-to-human communications, and the like. The shown components (as items 150, 410, 420, 220, 440) represent one embodiment of the disclosure and are not to be construed as being a limitation of the disclosure's scope.

Various components of system 400, such as items 150, 410, 420, 220, 440, can include one or more computing devices 470, which can include hardware 480 and computer program products 490. The computing devices 470 can be general purpose computing devices, such as personal computers, servers, or in-vehicle computers. The devices 470 can also be special purposed devices specifically manufactured/constructed for a tailored purpose. A special purposed device can have unique hardware, electronic boards, firmware, etc, which is not able to be easily modified by software and used for a different purpose. In various embodiments, devices 470 can be implanted as stand-alone devices, as virtual devices, as distributed devices, as cooperative devices, and the like.

Hardware 480 can include a processor 482, nonvolatile memory 483, volatile memory 484, network transceiver 485, and other components linked via a bus 486. The computer program products 490 can include programmatic instructions that are digitally encoded in a memory (e.g., memory 483, 484) and able to be executed by the processor 482. Computer program products 490 include boot firmware 492, (e.g., basic input/output system (BIOS)), an optional operating system 493 (i.e., special purposed devices can be optimized so an operating system 493 is merged with applications 494 and/or modules 495), applications 494, and other executable modules 495. The operating system 493 can include mobile device operating systems, desktop operating systems, server operating system, virtual operating systems, and/or distributed operating systems.

Unlike many computing systems, system 400 can be a security sensitive one where data classifications are highly important. That is, information acquired from data sources 150, stored in VOX GIS 440, and used to drive simulation devices 220 can include unclassified, secret, top secret (including compartmentalizations) information. Classification components 404, 414, 424 can exist, which implement comprehensive and conservative rules to automatically classify information into appropriate classifications. Additionally, sanitizers (e.g., sanitizer 426) can be used in system 400 to downgrade semantic content (e.g., from secret to unclassified, for example) of conveyed data elements to ensure that classification based restrictions are not violated. Moreover, different network 460 channels and information handling standards can be imposed based on classification level of the information being conveyed. A further complication is that aggregating and/or analyzing data from different sources 150 can change a classification level of the base data. Automated mechanisms (i.e., classifier 414, aggregator 428, and/or Voxel GIS 440, when aggregating data from multiple sources 150, can reevaluate and appropriately adjust resultant security classification levels) to conservatively handle data classifications are needed in system 400, especially in embodiments where data acquisition to model production (e.g., duration 212 of embodiment 210, for instance) is expedited.

The security sensitivity requirements can result in physically separate channels (e.g., within network 460, for example) for information conveyance. Further, storage regions for the different data classifications (e.g., within Voxel GIS 440, for example) can remain isolated from each other. Known standards for handling classified information exist as do a myriad of automated techniques, which can be utilized for system 400. Various components (classifier 404, 414, 424, security manager 442, sanitizer 426) are shown in system 400 to express that system 400 can implement security classification technologies. Comprehensive coverage of these known technologies is not the focus of this disclosure. For simplicity of expression, classification techniques have not been overly elaborated upon herein. It should be understood that integration of classification specific techniques for information handling are contemplated for the disclosure.

It should also be acknowledged that the specific arrangements of system 400 are expected to vary from implementation-to-implementation. For example, discrete network 460 attached servers are shown for intake (intake server 410) and outtake (outtake server 420) of information to and from the Voxel GIS 440. As shown, intake server 410 can perform intake processing operations (process 310, for example). Outtake server 420 can perform out taking processing operations (process 350 and/or 370, for example). In one embodiment, operations attributed to server 410 or 420 can be integrated into the Voxel GIS 440 or other system 400 components (e.g., one or more intake server 410 operations can be performed by data source 150; one or more outtake server 420 operations can be performed by simulation device 220). For example, in one embodiment, pre-processing unit 402 can optionally perform operations described for normalizer 160 and/or data to volume unit mapping component 162.

Additional components not explicitly expressed in association with system 400, which are consistent with performing operations described in the disclosure, are to be considered present in system 400. Further, logical mappings from system 400 components to operations described herein are assumed to be present. For example, in various contemplated embodiments, compactor 444 can perform operations described in step 340 of FIG. 3A; semantic optimizer 446 can perform operations described in step 338 of FIG. 3A; and, confidence adjustor 416 can perform operations previously described in step 330 and 338. Further, operations of the output generator 172 are to be considered as being performed by components of simulation device 220.

Turning to Voxel GIS 440, a number of characteristics should be noted. First, as new information for Voxel GIS 440 is acquired (from data sources 150), a probability distribution of surface location and surface appearance can be dynamically and programmatically constructed (using Bayesian statistical learning algorithms, for example). In this sense, voxels of the GIS 440 do not store a fixed appearance (of volume units 112 from a real-world volumetric space 110) but instead store a dynamic probability of multiple appearances, which can be learned and/or refined over time.

This characteristic of GIS 440 not only permits efficient handling of uncertainty, but turns traditional data overload challenges into an advantage. That is, over time, information acquisition via satellites, SIGINT, and other automated sources has geometrically increased. Concurrently, a quantity of human analysts responsible for rapidly responding to acquired information has decreased and/or remained constant. In the past, different information channels or products from different sources 150 were handled in a stove-piped manner. Different human analysts would receive and/or analyze satellite data, SIGInt data, HUMint data, and the like. One result of this situation is that collected data is often not being analyzed in a timely manner. Additionally, collected data is typically analyzed in isolation (e.g., single images from satellites are analyzed by people lacking pertinent geospatial related data from other sources 150). Fusion tools are currently deficient and/or lacking, which is a situation expected to worsen in absence of a paradigm shift in how information is managed and analyzed. The Voxel GIS 440 is a central component for this needed paradigm shift.

To elaborate using diagram 510, Voxel GIS 440 is able to efficiently aggregate information. This aggregation efficiency actually accelerates as information density increases. For example, as a number of images encoded within GIS increases, Voxel GIS 440 storage requirements can actually decrease (or at least become more efficient that the straight line increase experienced using a traditional GIS). Aggregation efficiency results from the "holographic-like" nature of voxel storage space, where an increase in information density increases clarity of the volumetric storage space 120. Uncertainty is reduced, which can reduce storage requirements (e.g., decreasing overhead needed for maintaining "noise" or abnormal data points in volumetric storage space 120).

Aggregation efficiency of the Voxel GIS 440 is represented in diagram 510 by a set of images 520-526 of a stored voxel space. The images 520-526 are static geospatial images of real-world terrain taken from satellite images, yet the demonstrated principle is consistent regardless of the specific input being encoded in voxel space. Image 520 shows a visual depiction of a voxel space formed from ten images. Image 522 shows the same voxel space after 20 images have been processed. Image 524 shows the voxel space after 30 images. Image 526 shows same voxel space, that has been refined using LIDAR points in conjunction with the thirty images. As shown, it becomes evident that an increase in information density decreases uncertainty of an encoded voxel space and increases "fidelity" of the stored information. That is, as information density increases surface probabilities become better defined. More voxels (and associated data) in "empty space" can be discarded.

It can be mathematically shown that as information density approaches infinity, storage space requirements for the Voxel GIS 440 approaches (effectively equals) a theoretical minimal storage space required by the imagery (and/or data elements being stored). At relatively low information densities (compared to that currently being handled by intelligence agencies) a cross-over point 514 occurs, where it is more efficient to store equivalent data within a Voxel GIS 440 than it is to store equivalent data in a non-voxel GIS (e.g., a conventional GIS). Post cross-over point 514 voxel GIS 440 storage space advantages continue to increase, as shown by chart 512. It should be noted that although many examples presented herein are in context of intelligence activities, Voxel GIS 440 aggregation efficiencies and techniques are domain independent can be used for any geospatial data set.

In voxel database 440 information can be indexed against voxels in different manners. In one embodiment, some records 132 can be directly indexed against uniquely identified voxels (in voxel database 130, for example). Other records 452 can be indexed against features, which are stored in a feature data base 450. Cross indexing between voxel database 130 and feature database 450 can occur.

A feature can be a representation of an object in a physical world (or a simulated object) having its own unique identity and characteristics. Buildings, trees, highways, rivers, lakes, and the like are examples of features. A volume in volumetric storage space 120 occupied by a feature can be defined by a volumetric envelope. The volumetric envelope can be composed of one or more shape primitives. Shape primitives can be a set of basic volumetric shapes that are easily defined by a relatively small number of numeric parameters.

When features and voxel references are both stored in the voxel GIS 440, different consistent semantic mappings can be utilized. In one embodiment, voxel-level semantic content 456 can include spectral signature attributes (e.g., Multispectral Imaging (MSI), Hyperspectral Imaging (HSI), etc.), visual attributes (relating to a human's sense of sight), olfaction attributes (relating to a human's sense of smell), audition attributes (relating to a human's sense of hearing), gustation attributes (relating to a human's sense of taste), somatosensory attributes (relating to a humans sense of touch, temperature, proprioception, and nociception), material composition attributes, and the like. Voxel-level content 456 is not limited to human specific senses and can include machine senses, especially when stored content is to be utilized for unnamed vehicles, drones, and the like. Feature-level semantic content 454 can include a feature identifier, a feature type, a set of feature attributes (physical dimensions, geographic name, functional usage, etc.), and the like.

Diagram 530 provides an illustrated example for describing features. In diagram 530, an envelope 534 of a voxel space 532 can contain features 540 and 542. Feature 540 can be uniquely identified as Feature0001, which is a feature identifier. The feature type of Feature 540 can be a building. Feature 542 can be an air conditioning unit positioned on top of the building. As shown, each feature 540, 542 is formed from single shape primitives 550 and 552, which are both boxes. Features can include any number (from 1 to N) of shape primitives. Each shape can include (be mapped to) a set of voxels. For example, three voxels 560 can form shape 550. In one embodiment, the voxel GIS 340 can include software implemented tools to automatically detect and define shapes, features, and envelopes in a given voxel space.

While any number of shape primitives can be supported by system 400, some common shape primitives include but are not limited to boxes, cylinders, spheres, and cones.

In one embodiment, shape primitives used by system 400 can conform to existing standards for enhanced compatibility. For example, shape primitives can conform to Open Graphics Library (OpenGL) standards for 3D computer graphics. In one embodiment, Coin3D, which is a C++ object oriented retained mode 3D graphics Application Program Interface (API) used to provide a higher layer of programming for OpenGL, objects can be mapped to shape primitives as follows: a box equates to a SoCube; a cylinder equates to a SoCylinder; a sphere equates to a SoSphere; and, a cube equates to a SoCone. In another embodiment, mappings to geospatial scheme of the National Geospatial-Intelligence Agency (NGA) can be as follows: a box equates to a RectangularPrism; a cylinder equates to a Vertical Cylindrical; a sphere equates to a spherical; and, a cube can have no equivalent. In still another embodiment, mappings to a computer aided design (CAD) scheme can be as follows: a box equates to an Axis Aligned Bounding Box (AABB); a cylinder equates to a Cylinder, Flat Ends; a sphere equates to a Cylinder, Round Ends, Zero Length; and, a cube can have no equivalent.

In one embodiment, the voxel query engine 168 of the Voxel GIS 440 can perform seamless and user transparent queries across the different databases 130, 450. It should be noted, that although being referred to as different databases 130, 450 a single unified database (or other indexed repository) can be utilized in the disclosure for both voxel-indexed records 132 and feature indexed records 452.

Figure 6:
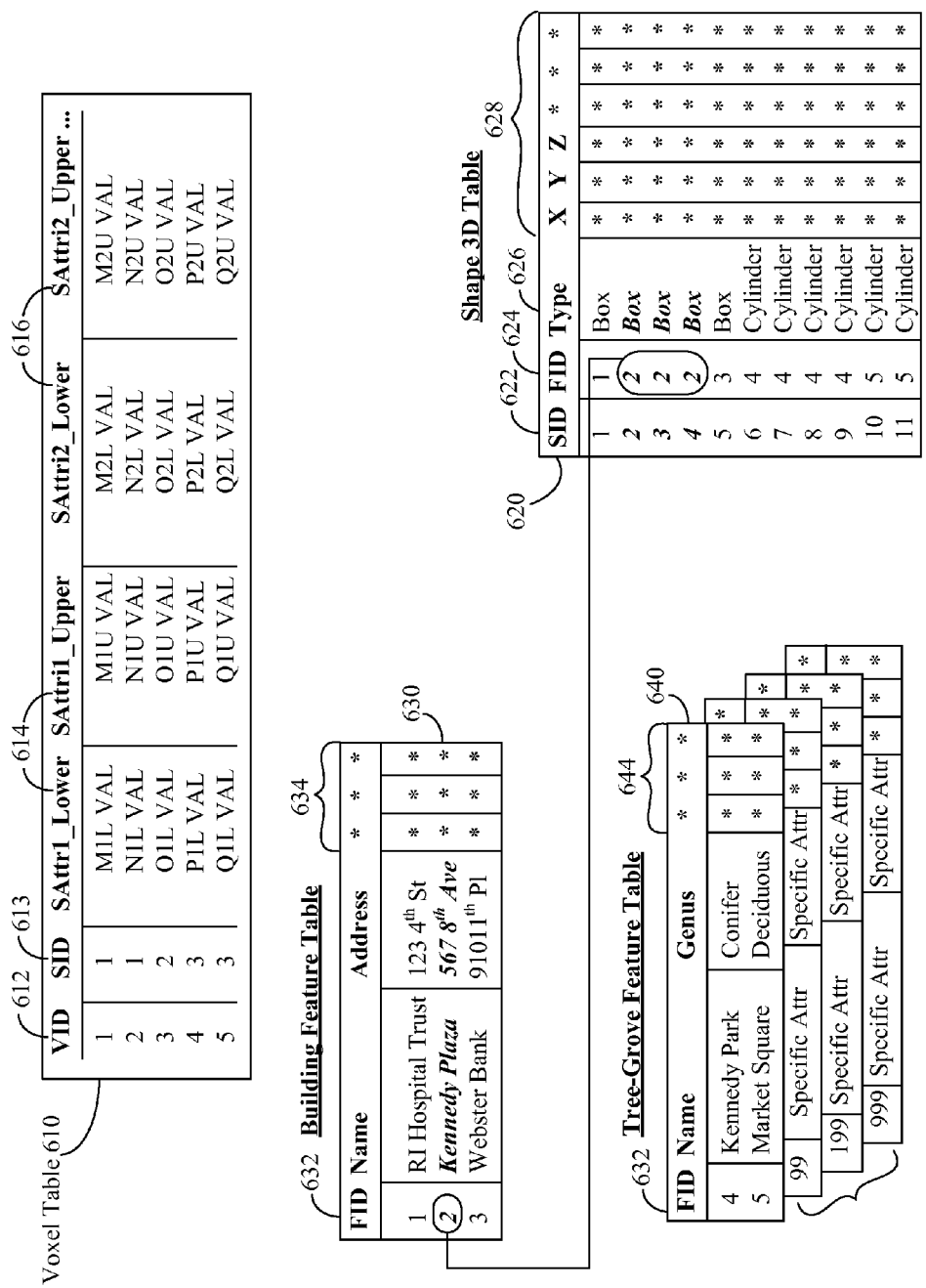
FIG. 6 illustrates a set of tables for a voxel GIS in accordance with an embodiment of the disclosure.

FIG. 6 illustrates a set of tables 610, 620, 630, 640 for a voxel GIS in accordance with an embodiment of the disclosure. In one embodiment, the tables 610, 620, 630, 640 can be RDBMS tables in third normal form. The tables 610, 620, 630, 640 can include a plurality of records (e.g., records 132 and 452).

Voxel table 610 includes a VID 612, which is a unique identifier for each voxel. SID 613 can be a unique identifier for a shape primitive in a voxel space. Any quantity (1 . . . N) of attributes can be associated with each unique voxel of table 610. For example, each detailed semantic content element 456 can have an associated attribute 614, 616. In one embodiment, each attribute 614, 616 in the voxel table 610 can have at least two values, such as a lower value and an upper value. The multiple values can be used to record different levels of certainty for each attribute 614, 616. For example, one source can report a first value of an attribute 614, 616 with a definable degree of certainty and a different value can be reported for the same attribute 614, 616 with a different degree of certainty. Although two values (lower and upper) are shown for each attribute 614, 616, any number of values (1 . . . N) can be used in table 610.

Each record in shape table 620 can includes a unique shape identifier, SID 622. A secondary key for a feature ID 624 can also be included. Table 620 can also include a type 626 attribute. A set (0 . . . N) of additional shape specific attributes 628 can also exist.

Each unique feature can be associated with a feature identifier, FID 632. In one implementation, different types of tables 630, 640 can exist, one for each unique category or type of object, which corresponds to a feature. For example, one table 630 can exist for buildings and another table 640 can exist for tree groves. Each table 630, 640 can have an associated set of attributes 634, 644, which are unique to a specific type of object. It should be appreciated that arrangements of tables 610, 620, 630, 640 are presented to illustrate a concept expressed herein and are not to be construed as a limitation of the disclosure.

The disclosure may be embodied as a method, system, or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the disclosure may take the form of a computer program product on a computer-usable storage medium having computer-usable program code embodied in the medium. In a preferred embodiment, the disclosure is implemented in software which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device. Any suitable computer-usable or computer-readable medium may be utilized. The computer-usable or computer-readable medium may be, for example but not limited to, an electronic, magnetic, optical, electromagnetic, infrared, or semiconductor system, apparatus, or device. Examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD.

Computer program code for carrying out operations of the disclosure may be written in an object-oriented programming language such as JAVA, Smalltalk, C++, or the like. However, the computer program code for carrying out operations of the disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams in FIGS. 1-6 illustrate the architecture, functionality, and operation of possible implementations of systems, methods, and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for handling spatially referenced data comprising:
   identifying, with at least one processor, a volumetric storage unit (VSU) database representing a volumetric storage space comprising a set of unique volumetric storage units, wherein data elements are stored to specific ones of the VSUs, wherein a spatial position of the data elements within the volumetric storage space is defined at least in part by which of the VSUs the data elements are stored, wherein at least a portion of the data elements comprise a plurality of different sensory attributes;
   within the VSU database, establishing, with at least one processor, a plurality of VSU records in a VSU table, where each of the VSU records of the VSU table corresponds to one of the VSUs, wherein said VSU table is stored in a tangible storage medium; and
   for each of the VSU records, storing values for a unique VSU identifier, which uniquely identifies one of the VSUs represented by the corresponding one of the VSU records;
   for each of the VSU records, storing values for the plurality of different sensory attributes, wherein the plurality of different sensory attributes comprise visual attributes and at least one attribute selected from a group of attributes consisting of a spectral signature attribute, an olfaction attribute, an audition attribute, a gustation attribute, a somatsensory attribute, and a material composition attribute, wherein each of the different sensory attributes of the VSU records apply to a specific subregion of the volumetric storage space, wherein values of the unique VSU identifiers of the VSU records define a set of VSUs, which define at least a portion of the specific-sub-region and
   establishing, within a feature database, a plurality of feature records in a plurality of feature tables, wherein each of the feature records comprises a unique feature identifier, a feature type, and a plurality of feature attributes, wherein a feature corresponds to a tangible object or a representation of a tangible object, wherein different feature tables are tables specific to different types of tangible objects, and wherein the feature attributes of the feature tables are specific attributes for tangible objects or representations of tangible objects, which vary from feature table to feature table; and
   establishing, within the feature database, a plurality of shape records in a shape table, wherein each of the shape records comprises a unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and slopes, wherein each VSU record of the VSU table; comprises a foreign key to a shape identifier uniquely identifying a shape record of the shape table.

2. The method of claim 1, further comprising:
   receiving a VSU database request, wherein the VSU database request is specific to a requested region of the volumetric storage space; and
   querying, with at least one processor, said VSU database to generate a response to the VSU database request, wherein the response comprises a response set of VSUs corresponding to the requested region and the values of the plurality of different sensory attributes that correspond to each of the VSUs of the response set.

3. The method of claim 1, further comprising:
receiving a VSU database request;
querying, with at least one processor, the VSU database to generate a response to the VSU database request, Wherein the response comprises a response set of VSUs and the values of the plurality of different sensory attributes that correspond to each of the VSUs of the response set; and
providing the response to a computing device having an interactive user interface for a simulated three dimensional volume of space referred to as a simulation space, wherein VSUs of the volumetric storage space map to volumetric, units of the simulation space, wherein the computing device comprises hardware and computer program products stored on a tangible storage medium and executable upon said hardware, said hardware comprising at least one sensory output device, which generates output based upon values of the plurality of different sensory attributes received in the response whenever a volumetric unit of simulation space is presented in the interactive user interface that corresponds to an associated one of the VSUs of the response set.

4. The method of claim 3, wherein the user interface is a three dimensional user interface, the method further comprising:
presenting the three dimensional user interface showing at least a portion of the simulation space with the computing device, wherein said three dimensional user interface is a multi-sensory interface comprising a visual output and output for at least one additional sense selected from a group of senses comprising smell, touch, taste, and temperature, wherein the at least one sensory output device generates output for the at least one additional sense.

5. The method of claim 1, further comprising:
identifying information units of a real world volumetric space, wherein the information units are obtained from sensors that sense conditions of the real world volumetric space, wherein volumetric units of the real world volumetric space map to VSUs of the volumetric storage space, wherein at least one of the information units comprises olfaction input, audition input, gustation input, and somatsensory input; and
storing each of the information units as one of the data elements of the VSU database.

6. The method of claim 1, wherein the plurality of different sensory attributes comprise the spectral signature attribute.

7. The method of claim 1, wherein the plurality of different sensory attributes comprise the olfaction attribute.

8. The method of claim 1, wherein the plurality of different sensory attributes comprise the audition attribute.

9. The method of claim 1, wherein the plurality of different sensory attributes comprise the gustation attribute.

10. The method of claim 1, wherein the plurality of different sensory attributes comprise the somatsensory attribute.

11. A computer program product for handling spatially referenced multi-sensory data, the computer program product comprising:
a non-transitory computer readable storage medium having computer usable program code embodied therewith, the computer usable program code comprising:
computer usable program code operable to identify a volumetric storage unit (VSU) database representing a volumetric storage space comprising a set of unique volumetric storage units, wherein data elements are stored to specific ones of the VSU, wherein a spatial position of the data elements within the volumetric storage space is defined at least in part by which of the VSUs the data elements are stored, wherein at least a portion of the data elements comprise a plurality of different sensory attributes;
computer usable program code operable to, within the VSU database, establish a plurality of VSU records in a VSU table, where each of the VSU records of the VSU table corresponds to one of the VSUs, wherein said VSU table is stored in a tangible storage medium; and
computer usable program code operable to, for each of the VSU records, store values for a unique VSU identifier, which uniquely identifies one of the VSUs represented by the corresponding one of the VSU records;
computer usable program code operable to, for each of the VSU records, store values for the plurality of different sensory attributes, wherein the plurality of different sensory attributes comprise visual attributes and at least one attribute selected from a group of attributes consisting of a spectral signature attribute, an olfaction attribute, an audition attribute, a gustation attribute, a somatsensory attribute, and a material composition attribute, wherein each of the different sensory attributes of the VSU records apply to a specific sub-region of the volumetric storage space, wherein values of the unique VSU identifiers of the VSU records define a set of VSUs, which define at least a portion of the specific-sub-region;
computer usable program code operable to establish, within a feature database, a plurality of feature records in a plurality of feature tables, wherein each of the feature records comprises a unique feature identifier, a feature type, and a plurality of feature attributes, wherein a feature corresponds to a tangible object or a representation of a tangible object, wherein different feature tables are tables specific to different types of tangible objects, and wherein the feature attributes of the feature tables are specific attributes for tangible objects or representations of tangible objects, which vary from feature table to feature table; and
computer usable program code operable to establish, within the feature database, a plurality of shape records in a shape table, wherein each of the shape records comprises a unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and shapes, wherein each VSU record of the VSU table comprises a foreign key to a shape identifier uniquely identifying a shape record of the shape table.

12. The computer program product of claim 11, the computer usable program code further comprising:
computer usable program code operable to receive a VSU database request, wherein the VSU database request is specific to a requested region of the volumetric storage space; and
computer usable program code operable to query said VSU database to generate a response to the VSU database request, wherein the response comprises a response set of VSUs corresponding to the requested region and the values of the plurality of different sensory attributes that correspond to each of the VSUs of the response set.

13. A computing device comprising:
a processor;
a non-volatile memory;
a volatile memory;
a plurality of input devices;

a plurality of output devices, wherein each output device of each plurality of input devices generate output for at least two different senses;
a bus communicatively linking the processor non-volatile memory, volatile memory, the input devices, and the output devices to each other;
a plurality of computer program products tangibly stored on the non-volatile memory or the volatile memory, wherein instructions of the computer program products are executable by the processor, wherein said computer program products comprise:
a volumetric storage unit (VSU) engine able to directly consume data elements of a volumetric storage space, wherein the data elements are stored to specific ones of a set of VSUs wherein a spatial position of the data elements within the volumetric storage space is defined at least in part by which of the VSUs the data elements are stored, wherein at least a portion of the data elements comprise a plurality of different sensory attributes, wherein each VSU corresponds to a simulation unit of a simulation space;
an application stored on a tangible medium able to be executed by a processor that is operable to generate a user interactive interface for the simulation space, wherein said application receives using input via the plurality of input devices and responds to the user input by altering expressed characteristics of the simulation space, wherein output for the simulation space is produced by the output devices, wherein the application permits a user to selectively navigate within the simulation space, which results in changes to which simulation units are expressed to the user via the output devices, wherein output for at least two senses is generated by the output devices for each simulation unit in accordance with code of the simulation application, wherein the output for the at least two senses is generated from the different sensory attributes defined within the data elements of the volumetric storage space for at least one voxel that maps to the corresponding simulation unit;
a plurality of feature records in a plurality of feature tables stored in the tangible storage medium, wherein each of the feature records comprises a unique feature identifier, a feature type, and a plurality of feature attributes, wherein a feature corresponds to a real world object, wherein different feature tables are tables specific to different types of real world objects, and wherein the feature attributes of the feature tables are specific attributes for the real world objects, which vary from feature table to feature table; and
a plurality of shape records in a shape table stored in the tangible storage medium, wherein each of the shape records comprises a unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and shapes, wherein each record of the shape table comprises a foreign key to a shape identifier.

14. The computing device of claim 13, wherein the volumetric storage space is a probabilistic data storage space that represents a level of uncertainty by incorporating inconsistent data elements from different data sources.

15. The computing device of claim 13, wherein the different sensory attributes comprises multispectral imaging (MSI) and hyperspectral imaging (HSI) data, wherein the output devices comprise instrumentation comprising radar instrumentation that utilizes the MIS data and thermal imaging instrumentation that utilizes the HSI data.

16. The computing device of claim 13, Wherein the different sensory attributes comprises olfaction data, wherein the output devices comprise an odor output device, wherein odors are generated by the odor device utilizing the olfaction data for simulation units of the simulation space presented in the user interactive interface.

17. The computing device of claim 13, wherein the different sensory attributes comprises audition data, wherein the output devices comprise at least one speaker, wherein sound is generated by the at least one speaker utilizing the audition data for simulation units of the simulation space presented in the user interactive interface.

18. The computing device of claim 13, wherein the different sensory attributes comprises gustation data, wherein the output devices comprise a taste output device, wherein tastes are generated by the taste output device utilizing the gustation data for simulation units of the simulation space presented in the user interactive interface.

19. The computing device of claim 13, wherein the different sensory attributes comprises somatsensory data, wherein the output devices comprise a tactile output device, wherein tactile sensations are generated by the tactile device utilizing the somatsensory data for simulation units of the simulation space presented in the user interactive interface.

20. The computing device of claim 13, wherein the different sensory attributes comprises somatsensory dab, wherein the output devices comprise a thermal output device, wherein thermal sensations are generated by the thermal device utilizing the somatsensory data for simulation units of the simulation space presented in the user interactive interface.

21. The computing device of claim 13, wherein the computing device is an immersion trainer.

22. The computing device of claim 13, wherein the computing device is a mission rehearsal system for tactical engagements.

23. The computing device of claim 13, wherein the computing device is an intelligence analysis system.

24. The computing device of claim 13, wherein the computing device is a tactical vehicle training system.

25. A system comprising:
a volumetric storage unit (VSU) database representing a volumetric storage space comprising a set of unique volumetric storage units, wherein data elements are stored to specific ones of the VSUs, wherein a spatial position of the data elements within the volumetric storage space is defined at least in part by which of the VSUs the data elements are stored, wherein said data elements comprise a plurality of different sensory attributes;
at least one processor to access the voxel VSU database;
a plurality of feature records in a plurality of feature tables stored in a tangible storage medium, wherein each of the feature records comprises a unique feature identifier, a feature type, and a plurality of feature attributes, wherein a feature corresponds to a real world object, wherein different feature tables are tables specific to different types of real world objects, and wherein the feature attributes of the feature tables are specific attributes for the real world objects, which vary from feature table to feature table; and
a plurality of shape records in a shape table stored in the tangible storage medium, wherein each of the shape records comprise to unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and shapes, wherein each record of the shape table comprises a foreign key to a shape identifier.

26. The system of claim 25, wherein the plurality of different sensory attributes comprise visual attributes and at least one attribute selected from a group of attributes consisting of a spectral signature attribute, an olfaction attribute, an audition attribute, a gustation attribute, a somatsensory attribute, and a material composition attribute, wherein each of the different sensory attributes apply to a specific sub-region of the volumetric storage space, wherein values of the unique VSU identifiers of the VSU records define a set of VSUs, which define at least a portion of the specific-sub-region.

27. A system comprising:
a plurality of volumetric storage unit (VSU) records in a VSU table, where each of the records has a unique VSU identifier, wherein the VSU table is stored in a tangible storage medium;
each VSU record comprising a plurality of different sensory attributes, the different sensory attributes comprising visual attributes and at least one attribute selected from a group of attributes consisting of spectral signature attribute, olfaction attribute, audition attribute, gustation attribute, somatsensory attribute, and material composition attribute, wherein uniquely defined VSUs of a VSU database is each a volume unit on a grid in three dimensional space, which is a volumetric storage space, wherein a spatial correspondence exists between VSUs in the volumetric storage space and volume units of a real world volumetric space from which spatially dependent data elements including data for the different sensory attributes was directly acquired, wherein within the VSU database a spatial position for the sensory attributes are dependent upon a position of at least one VSU that corresponds to the sensory attributes by being part of a common VSU record;
at least one processor to access the tangible storage medium;
a plurality of feature records in a plurality of feature tables stored in the tangible storage medium, wherein each of the feature records comprises a unique feature identifier, a feature type, and a plurality of feature attributes, wherein a feature corresponds to a real world object, wherein different feature tables are tables specific to different types of real world objects, and wherein the feature attributes of the feature tables are specific attributes for the real world objects, which vary from feature table to feature table; and
a plurality of shape records in a shape table stored in the tangible storage medium, wherein each of the shape records comprises a unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and shapes, wherein each record of the VSU table comprises a foreign key to a shape identifier.

28. The system of claim 27, wherein the different sensory attributes comprise at least two attributes selected from a group of attributes consisting of spectral signature attribute, olfaction attribute, audition attribute, gustation attribute, somatsensory attribute, and material composition attribute, wherein a correspondence exists between VSUs and volume units of the real world volumetric space.

29. The system of claim 27, Wherein the different sensory attributes comprise at least three attributes selected from a group of attributes consisting of spectral signature attribute, olfaction attribute, audition attribute, gustation attribute, somatsensory attribute, and material composition attribute.

30. The system of claim 27, wherein the different sensory attributes comprise attributes selected from a group of attributes consisting of spectral signature attribute, olfaction attribute, audition attribute, gustation attribute, somatsensory attribute, and material composition attribute.

31. The system of claim 27, wherein data stored in the VSU database is probabilistic data that represents a level of uncertainty by incorporating inconsistent geospatial data from a plurality of different data sources.

32. The system of claim 27, wherein each of the different sensory attributes comprises a lower value and an upper value, wherein the lower value and upper value expresses a degree of uncertainty of that sensory attribute.

33. The system of claim 27, wherein the VSU database is a component of a geographic information system, which also includes a feature database comprising a plurality of feature records in a plurality of feature tables, which are indexed against VSUs in the VSU database, wherein each feature corresponds to a tangible three dimensional object or a representation of a tangible three dimensional object.

* * * * *